United States Patent [19]

Jeffries et al.

[11] Patent Number: 5,011,465
[45] Date of Patent: Apr. 30, 1991

[54] WIDE SPEED-RANGE MULTI-SPEED POWER SHIFT TRANSMISSION

[75] Inventors: Dennis L. Jeffries, Waterloo; Gordon L. Marquart, Jesup, both of Iowa; Timothy J. Mattson, Golden Valley, Minn.

[73] Assignee: Deere & Company, Moline, Ill.

[21] Appl. No.: 511,697

[22] Filed: Apr. 20, 1990

[51] Int. Cl.⁵ ............................................. F16H 57/10
[52] U.S. Cl. .................................. 475/279; 475/290; 475/330
[58] Field of Search ............... 475/116, 120, 121, 127, 475/271, 275, 277, 279, 282, 288, 290, 319, 329, 330

[56] References Cited

U.S. PATENT DOCUMENTS

| | | | |
|---|---|---|---|
| 3,021,729 | 2/1962 | Chambers et al. | 475/290 X |
| 3,124,974 | 3/1964 | Hobbs | 475/279 X |
| 3,234,821 | 2/1966 | Himmel et al. | 475/279 |
| 3,298,252 | 1/1967 | Harris et al. | 475/279 |
| 4,345,490 | 8/1982 | Madson | 475/277 X |
| 4,546,672 | 10/1985 | Leboime | 475/279 |
| 4,660,439 | 4/1987 | Hiraiwa | 475/277 X |
| 4,817,462 | 4/1989 | Dach et al. | 475/275 X |

FOREIGN PATENT DOCUMENTS

2103736 2/1983 United Kingdom ............... 475/279

Primary Examiner—Dwight Diehl

[57] ABSTRACT

An in-line transmission provides 26 useful speeds, including 19 forward speeds and 7 reverse speeds. The transmission includes a main planetary having three sets of planetary gears, as well as a separate hi-lo planetary. At least the first and second sets of planetary gears on the main planetary carrier are formed of double gears. Each side of the first set of double gears has its own ring gear which is independently brakable relative to the housing and its own sun gear. Drive from the input shaft to these two sun gears is provided along two main paths, one direct and the other through the hi-lo planetary. One side of the second set of double gears also has an independently brakable ring gear, as well as a sun gear connected to the output shaft. However, the other side of the second set of double gears meshes only with the third set of planetary gears, which preferably are single gears. The third set of planetary gears has its own independently brakable ring gear, and its own sun gear which is both brakable to the housing and clutchable to the main planetary carrier. The hi-lo planetary carrier preferably also uses double gears as planetary gears, with its ring gear meshing with one side of the double gears and its sun gear meshing with the other side. The hi-lo sun gear is selectively brakable to the housing or clutchable to the hi-lo planetary carrier.

14 Claims, 6 Drawing Sheets

WIDE SPEED-RANGE MULTI-SPEED POWER SHIFT TRANSMISSION

BACKGROUND OF THE INVENTION

1. Field of the Invention

The present invention relates to vehicle transmissions, and particularly to transmissions having a large number of speed variations, e.g., for work vehicles such as agricultural tractors.

2. Description of the Related Art

U.S. Pat. No. 4,345,490 (Madson) depicts a transmission having a wide range of speeds, and theoretically 27 gear ratios. However, it has been found in practice that because of the extreme closeness of several of the resultant gear ratios, the structure taught in the '490 patent does not provide 27 gear ratios which are useful in practice.

It is not feasible simply to add another brake or clutch to the end of the structure shown in the '490 patent because this results in a number of clutch and brake discs and separators moving in opposite directions in many gear settings. Such a structure would create a high amount of turbulence in the oil in the system, and would be prone to breakdown.

SUMMARY OF THE INVENTION

It is the object of the present invention to provide a transmission structure which provides 26 gear ratios which are useful in practice. It is another object of the present invention to provide these gear ratios while keeping the inline physical envelope of the transmission essentially the same size as the transmission taught in the '490 patent.

These objects are accomplished according to the present invention by providing a transmission with first and second clutches controlling power input through two main drive paths to a main planetary carrier, which carries three sets of planetary gears. The first and second sets of planetary gears on the main planetary carrier are each formed by double gears, while the third set of planetary gears is formed of single gears.

One of the two power paths provides power directly to a first sun gear which engages one side of the first set of double planetary gears on the main planetary carrier, while the other path provides power via a hi-lo planetary to a second sun gear which meshes with the other side of the same first set of double planetary gears. Each side of the first set of double planetary gears also has its own ring gear which is selectively brakable to the housing.

One side of the second set of double planetary gears on the main planetary carrier meshes with a ring gear which is selectively brakable to the housing and with a sun gear connected to the output shaft, while the other side meshes with the single planetary gears. The single planetary gears also mesh with a sun gear which is selectively brakable to the housing and a ring gear which is both selectively brakable to the housing and selectively clutchable to the main planetary carrier.

This structure has the advantages that it can provide the desired 26 useful gear ratios within a physical envelope very similar to that of the transmission taught in the '490 patent.

BRIEF DESCRIPTION OF THE DRAWINGS

The present invention will be described in greater detail with reference to the following drawings:

FIGS. 2a-2d collectively will hereinafter be referred to as FIG. 2.

DETAILED DESCRIPTION OF THE PREFERRED EMBODIMENTS

Figure 1:
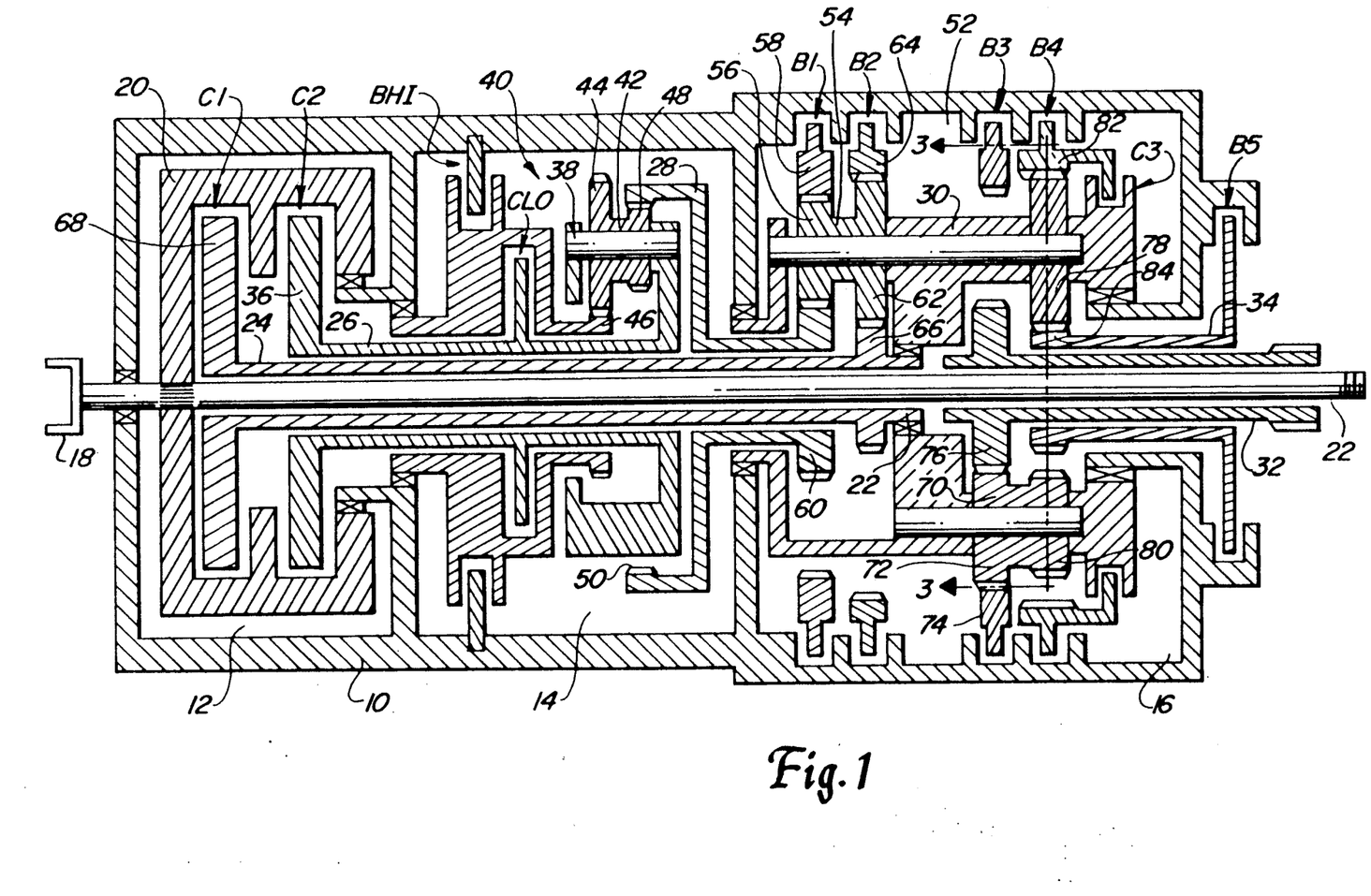
FIG. 1 is a schematic representation of a transmission according to the present invention.
Figure 2A:
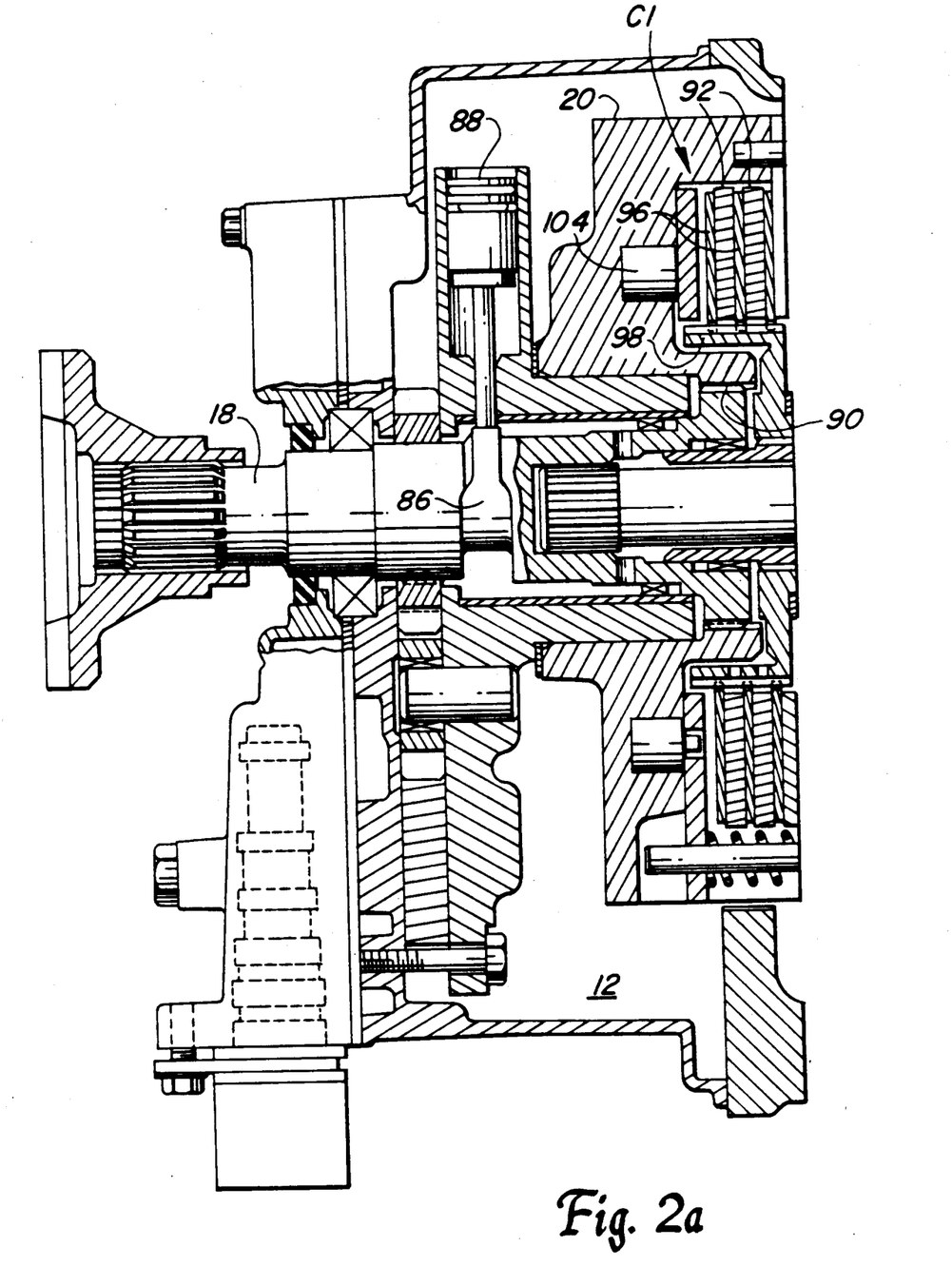
FIGS. 2a-2d may be assembled to form a single figure illustrating, in greater detail, the transmission schematically represented in FIG. 1.
Figure 2B:
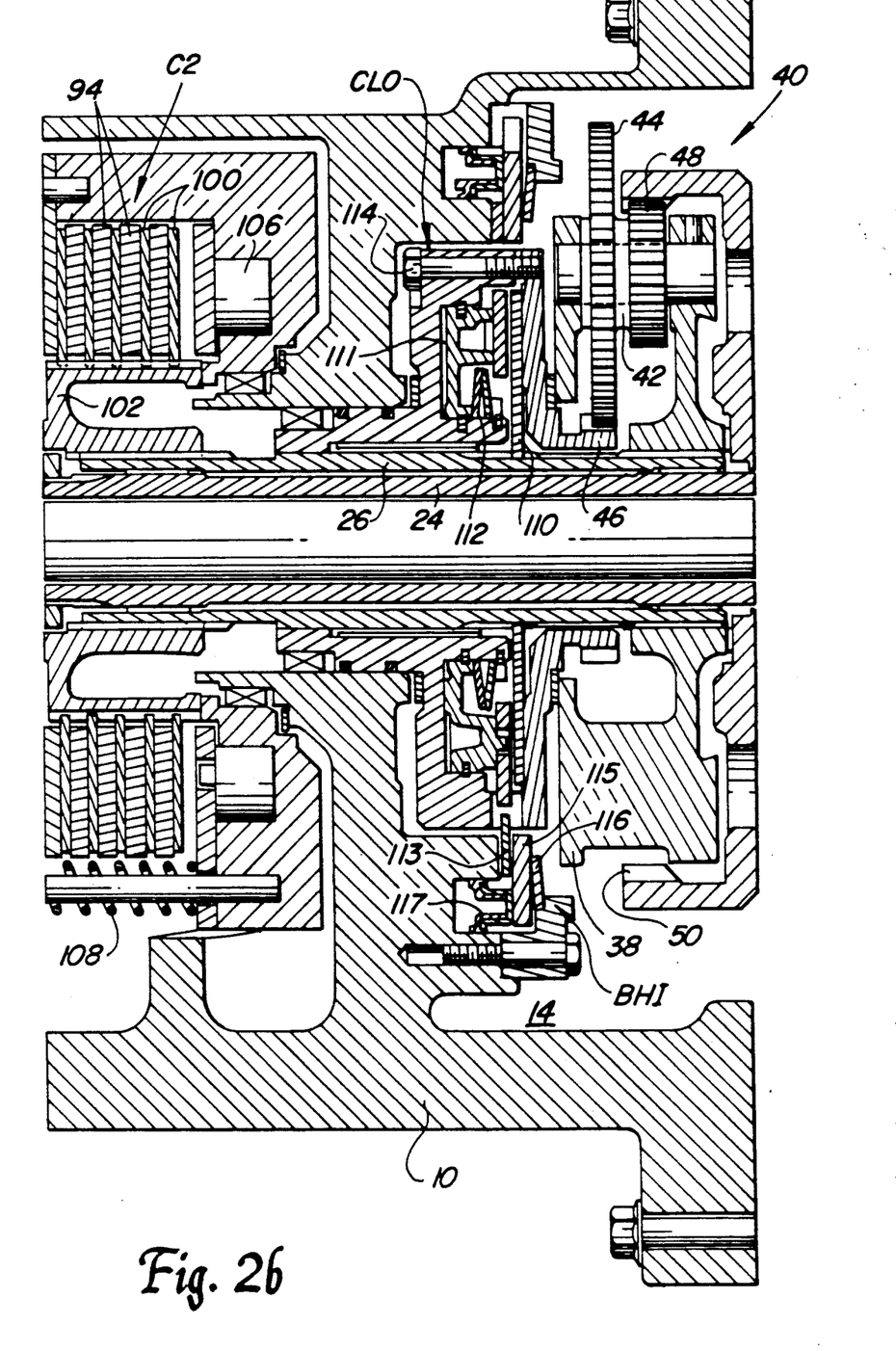
Figure 2C:
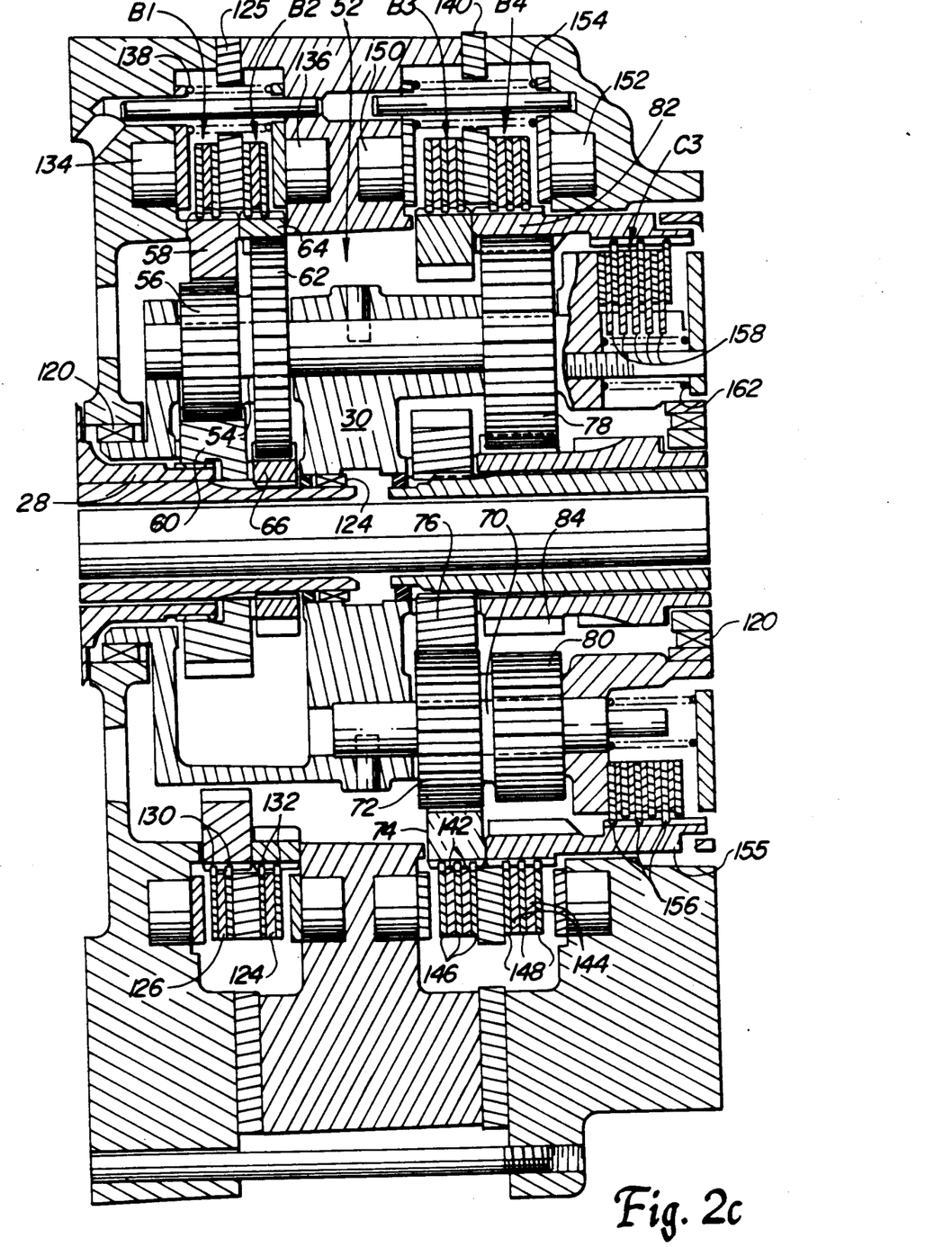
Figure 2D:
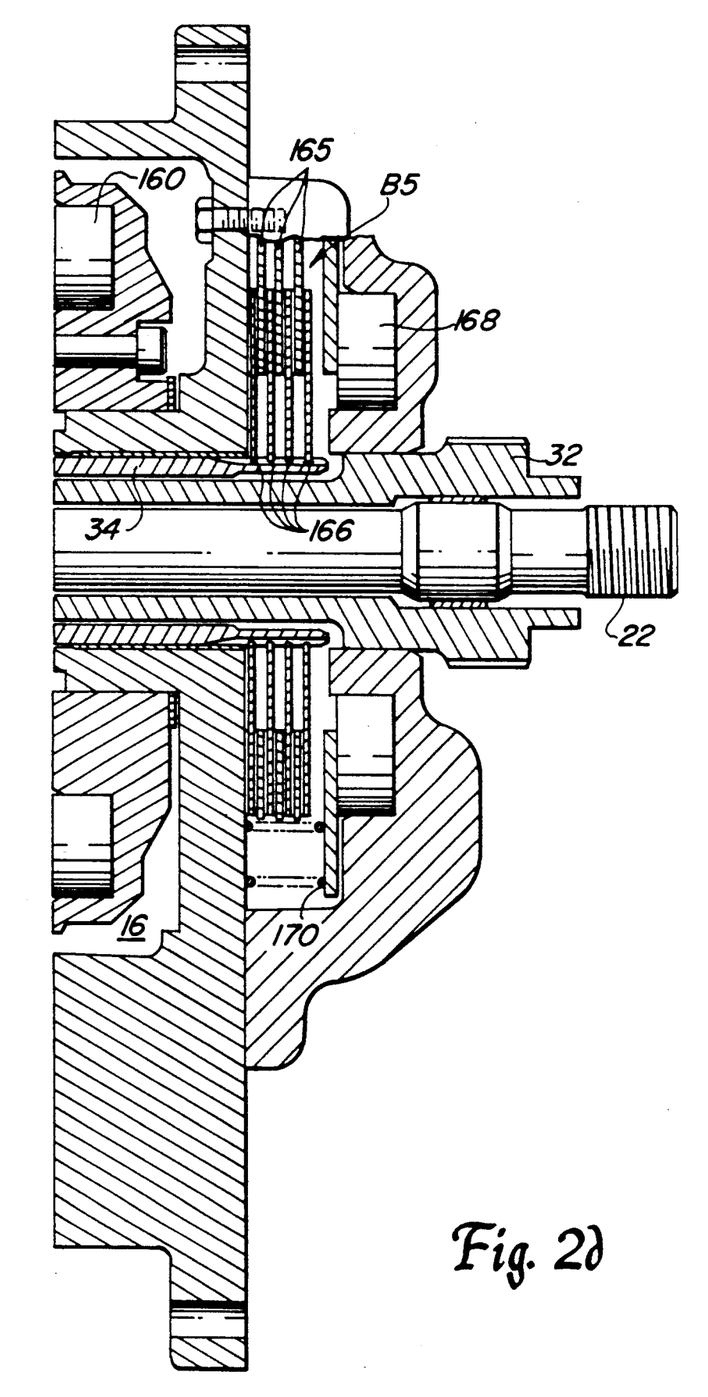

Referring to FIG. 1, the transmission housing 10 has three main compartments, namely, an input clutch compartment 12, a hi-lo planetary compartment 14, and a main planetary compartment 16. Proceeding from left to right, first clutch C1 and second clutch C2 are positioned in the input clutch compartment 12. Hi-lo brake BHI and hi-lo clutch CLO are positioned in the hi-lo planetary compartment 14. First brake B1, second brake B2, third brake B3, fourth brake B4, and third clutch C3 are positioned in the main planetary compartment 16. The fifth brake B5 is shown positioned outside of the main planetary compartment 16, but operates on components inside the main planetary compartment 16, and can be positioned inside the main planetary compartment 16, if desired.

An input shaft 18 driven by a prime mover (not shown) extends into the housing 10 at the left end thereof as viewed in FIG. 1. A clutch drum 20 for the clutches C1, C2 is fixed for rotation with the input shaft 18. An extension 22 of the input shaft continues out the right side of the housing 10, as viewed in the drawing, to provide unmodified power, e.g., to a power take-off shaft.

A first intermediate shaft 24 is rotatably mounted about the input shaft extension 22, and extends from the input clutch compartment 12 to the main planetary compartment 16. A second intermediate shaft 26 is rotatably mounted about the first intermediate shaft 24, but extends only from the input clutch compartment 12 to the hi-lo planetary compartment 14. An intermediate drum 28 also is rotatably mounted about the first intermediate shaft 24 to the right of the second intermediate shaft 26 as seen in the drawing, and extends from the hi-lo planetary compartment 14 to the main planetary compartment 16. Finally, the main planetary carrier 30 is rotatably mounted about the right-hand end of the first intermediate shaft 24 in the main planetary compartment 16.

An output shaft 32 is rotatably mounted about the input shaft extension 22 to the right of the first intermediate shaft 24, and extends from the main planetary compartment 16 to the outside of the housing 10. A brake shaft 34 is rotatably mounted about the outside of the output shaft 32 and extends from inside the main planetary compartment 16 to the brake B5. (It will be understood that while shaft 18 is referred to herein as the "input" shaft and shaft 32 as the "output" shaft, power could flow through the transmission in the opposite direction. These terms are used both in the specification and the claims simply as convenient identifiers, and are not intended in any way to limit the scope of the present invention.)

The left end 36 of the second intermediate shaft 26 is connected to the driven part of the second clutch C2. The opposite end of the second intermediate shaft 26 is connected to the planetary carrier 38 of the hi-lo planetary 40. A plurality of double gears 42 are rotatably mounted to the hi-lo planetary carrier 38. The left-hand gear 44 of the hi-lo double gears 42 meshes with the sun gear 46 of the hi-lo planetary 40, which can be braked against rotation relative to the housing 10 by the hi-lo brake BHI or clutched against rotation relative to the second intermediate shaft 26, and consequently, the hi-lo planetary carrier 38, by the clutch CLO. The right-hand gears 48 of the hi-lo double gears 42 mesh with the hi-lo ring gear 50, which is fixed for rotation with one end of the intermediate drum 28.

Turning to the main planetary 52, main planetary carrier 30 has three sets of planetary gears rotatably mounted thereto. The first set of planetary gears is formed by a plurality of double gears 54. The outside of the left-hand gears 56 of the first set of planetary gears 54 meshes with first ring gear 58, which can be braked against rotation relative to the housing 10 by the first brake B1. The inside of the left-hand gear 56 meshes with first sun gear 60, which is fixed for rotation with the intermediate drum 28 at the end thereof opposite from the hi-lo ring gear 50.

The outside of the right-hand gear 62 of the first set of planetary gears 54 meshes with the second ring gear 64, which can be braked against rotation relative to the housing 10 by the second brake B2. The inside of the right-hand gear 62 meshes with the second sun gear 66, which is fixed for rotation with the first intermediate shaft 24. The opposite end 68 of the first intermediate shaft 24 is connected to the driven part of the first clutch C1.

The second set of planetary gears also is formed of a plurality of double gears 70. The outside of the left-hand gears 72 of the double gears of the second set of planetary gears 70 meshes with the third ring gear 74, which can be fixed against rotation relative to the housing 10 by third brake B3. The inside of the left-hand gear 72 meshes with the third sun gear 76, which is fixed for rotation with the output shaft 32.

Figure 3:
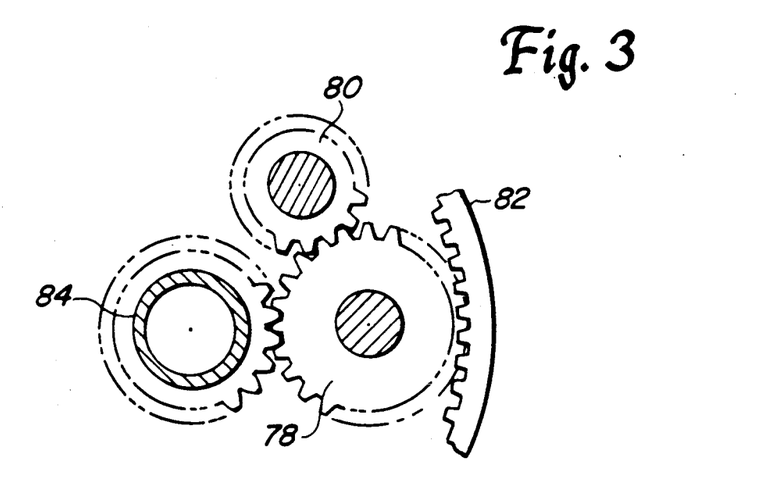
FIG. 3 is a cross-sectional view taken along line 3—3 in FIG. 1 and illustrates the engagement of various planetary gears carried on the main planetary carrier.

The third set of planetary gears is formed of a plurality of single gears 78 which are interspersed between the gears of the second set of planetary gears 70. The right-hand gears 80 of the double gears of the second set of planetary gears 70 meshes with the single gears of the third set of planetary gears 78, as best seen in FIG. 3. The outside of the third set of planetary gears 78 meshes with the fourth ring gear 82, which can be braked against rotation relative to the housing by brake B4 or clutched against rotation relative to the main planetary carrier 30 by the third clutch C3. The inside of the gears of the third set of planetary gears 78 mesh with the fourth sun gear 84, which is fixed for rotation with the brake shaft 34, and can be braked against rotation relative to the housing 10 by the fifth brake B5.

Turning to FIG. 2, the same reference numerals as shown in FIG. 1 have been used whenever appropriate. Turning first to the input shaft 18, the input shaft 18 is provided with a cam surface 86 to operate a pump 88 used for maintaining the appropriate oil level in the various compartments of the transmission housing 10. This cam surface and pump are the subject of co-pending U.S. Pat. application No. 07/374,885, filed 3 July 1989, titled "Air/Oil Level Control for Transmission Lubrication", which is incorporated herein by reference and will not be described further herein.

The outside of the right end of the input shaft 18 is connected by splines 90 to the clutch drum 20 of the first and second clutches C1, C2. The drum 20 in turn is splined to the clutch separators 92 of the first clutch C1 and the clutch separators 94 of the second clutch C2. The clutch disks 96 of the first clutch C1 are splined to the clutch hub 98 of the first clutch C1, while the clutch disks 100 of the second clutch C2 are splined to the hub 102 of the second clutch C2. The first clutch hub 98 is splined to the first intermediate shaft 24, while the second clutch hub 102 is splined to the second intermediate shaft 26. The first clutch C1 is provided with a piston 104 for activating the clutch C1 by compressing the clutch separators and disks 92, 96. Similarly, the second clutch C2 is provided with a piston 106 for activating the clutch C2 by compressing the clutch separators and disks 94, 100. A spring 108 is provided extending between the pressure plates of the pistons 104, 106 to bias the clutches C1, C2 out of engagement.

The clutch pistons 104, 106, as well as the other pistons to be described below, are provided with hydraulic or pneumatic fluid in the usual fashion, which is well-known to one of ordinary skill in the art, and therefore will not be described further herein.

Moving to the hi-lo planetary 40, the planetary carrier 38 and clutch disk 110 of the hi-lo planetary clutch CLO are splined to the second intermediate shaft 26 for rotation therewith. Clutch piston 111 is provided to engage the clutch CLO, and spring 112 to bias the clutch CLO 111 out of engagement. Brake disk 113 of the hi-lo planetary brake BHI is fixed to the planetary carrier 38 by at least one bolt 114, and rotates with the carrier 38. Plate 15 is biased by a spring 116 to engage the brake BHI, and brake piston 1117 is provided to press plate 115 away from the brake disk 113 to disengage brake BHI.

Preferably, the hi-lo clutch piston 111 and the hi-lo brake 117 are controlled by switching a single source of pressurized fluid from activating piston to activating the other. In this manner, only one of the pistons can be activated at a time.

Moving on to the main planetary 52, planetary carrier 30 is supported by bearings 120 by the housing 10. Bearing 124 positions and supports the first intermediate shaft 24 relative to the main planetary carrier 30. Various other bearings are provided throughout the transmission, but will not be described further herein.

First brake B1 and second brake B2 share a common large central separator plate 125 which is fixed to the housing 10. An additional separator plate 124 for the first brake B1 and an additional separator plate 126 for the second brake B2 both are positioned between the brake disks 130 for brake B1 and the brake disks 132 for the second brake B2, respectively. The brake disks 130 are splined to first ring gear 58, while brake disks 132 are splined to the second ring gear 64. Piston 134 is provided to engage first brake B1, while piston 136 is provided to engage second brake B2. A spring 138 is provided to bias brakes B1 and B2 out of engagement.

Similarly, third brake B3 and fourth brake B4 share a common large central separator plate 140 which is fixed to the housing 10. Again, additional separators 142 for third brake B3 and additional separators 144 are positioned between the brake disks 146 for third brake B3 and the brake disks 148 for the fourth brake B4, respectively. The brake disks 146 are splined to the third ring gear 74, while the brake disks 148 are splined to the fourth ring gear 82. Pistons 150, 152 are provided to activate the third and fourth brakes B3, B4, respectively, and a spring 154 is provided to bias the third and fourth brakes B3, B4 out of engagement.

Fourth ring gear 82 also is provided with an extension 155 to which the clutch disks 156 for third clutch C3 are splined. Separator disks 158 for the third clutch C3 are splined to the main planetary carrier 30. A piston 160 is provided to activate the third clutch C3, while a spring 162 is provided to bias the third clutch C3 out of engagement.

Finally, brake separators 165 for the fifth brake B5 are splined to the housing 10, while brake disks 166 are splined to the brake shaft 34 for rotation therewith. A piston 168 is provided to activate the fifth brake B5, while a spring 170 biases the fifth brake B5 out of engagement.

It should be noted that while the brakes and clutches are illustrated with a particular number of disks and separator plates, any number of disks and separator plates could be used, as needed for a particular application.

Preferably, each of the gears described above has the number of teeth indicated in Table I:

TABLE I

| Description | Element No. | No. of Teeth |
|---|---|---|
| Left-hand hi-lo planetary | 44 | 42 |
| Hi-lo sun gear | 46 | 33 |
| Right-hand hi-lo planetary | 48 | 18 |
| Hi-lo ring gear | 50 | 93 |
| Left-hand first planetary | 56 | 36 |
| First ring gear | 58 | 16 |
| First sun gear | 60 | 69 |
| Right-hand first planetary | 62 | 26 |
| Second ring gear | 64 | 72 |
| Second sun gear | 66 | 21 |
| Left-hand second planetary | 72 | 17 |
| Third ring gear | 74 | 63 |
| Third sun gear | 76 | 30 |
| Third planetary | 78 | 24 |
| Right-hand second planetary | 80 | 15 |
| Fourth ring gear | 82 | 69 |

TABLE I-continued

| Description | Element No. | No. of Teeth |
|---|---|---|
| Fourth sun gear | 84 | 21 |

OPERATION

To transmit power through the transmission described above, various of the brakes and clutches preferably should be engaged according to Table II:

TABLE II

| G | C1 | C2 | CLO | BHI | B1 | B2 | B3 | B4 | C3 | B5 | KPH | MPH |
|---|---|---|---|---|---|---|---|---|---|---|---|---|
| N |  |  | X |  |  |  |  |  |  |  | 0.00 | 0.00 |
| 1 | X |  | X |  | X |  |  |  | X |  | 1.65 | 1.02 |
| 2 | X |  | X |  |  | X |  |  | X |  | 2.37 | 1.47 |
| 3 | X |  | X |  | X |  |  |  |  | X | 2.97 | 1.84 |
| 4 |  | X | X |  | X |  |  |  | X |  | 3.59 | 2.23 |
| 5 |  | X |  | X | X |  |  |  | X |  | 4.14 | 2.57 |
| 6 |  | X | X |  |  | X |  |  | X |  | 4.70 | 2.92 |
| 7 |  | X |  | X | X |  |  |  | X |  | 5.41 | 3.36 |
| 8 |  | X | X |  | X |  |  |  |  | X | 6.44 | 4.00 |
| 9 |  | X |  | X | X |  |  |  |  | X | 7.43 | 4.61 |
| 10 |  | X | X |  |  | X |  |  |  | X | 8.43 | 5.24 |
| 11 |  | X |  | X | X |  |  |  |  | X | 9.71 | 6.03 |
| 12 |  | X |  | X |  |  | X |  |  |  | 11.14 | 6.92 |
| 13 |  | X |  | X | X |  | X |  |  |  | 12.84 | 7.97 |
| 14 |  | X | X |  |  | X | X |  |  |  | 14.57 | 9.05 |
| 15 |  | X |  | X |  | X | X |  |  |  | 16.78 | 10.42 |
| 16 | X | X | X |  |  |  |  |  |  | X | 18.80 | 11.67 |
| 17 | X | X |  | X |  |  |  |  |  | X | 23.26 | 14.44 |
| 18 | X | X | X |  |  |  |  | X |  |  | 32.49 | 20.18 |
| 19 | X | X |  | X |  |  |  | X |  |  | 40.20 | 24.96 |
| 1R | X |  | X |  | X |  |  |  |  | X | −2.66 | −1.65 |
| 2R | X |  | X |  |  | X |  |  |  | X | −3.80 | −2.36 |
| 3R |  | X | X |  | X |  |  |  |  | X | −5.77 | −3.58 |
| 4R |  | X |  | X | X |  |  |  |  | X | −6.65 | −4.13 |
| 5R |  | X | X |  |  | X |  |  |  | X | −7.55 | −4.69 |
| 6R |  | X |  | X |  | X |  |  |  | X | −8.70 | −5.40 |
| 7R | X | X | X |  |  |  |  |  |  | X | −16.84 | −10.46 |

In Table II, the final ground speeds listed assume that the gears in the transmission are provided with the number of teeth listed in Table I above, that the transmission is used in a vehicle having wheels with an 870 mm dynamic index and an 846 mm loaded radius, an engine speed at 2100 rpm, and a coefficient of friction of 0.09, i.e., a typical row-crop agricultural tractor.

While other combinations of clutches and brake engagements can be made, they tend to provide final reduction ratios very close to those above, or cause certain interleaved disks and separators to move in opposite directions, which is highly undesirable. Such other combinations also may result in excessive speeds, both in internal planetary speeds and external ground speeds. Accordingly, the gear ratios above are the main useful ratios available out of the transmission according to the present invention.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A vehicle transmission comprising:
 (a) a transmission housing;
 (b) an input shaft extending into said transmission housing;

(c) a main planetary carrier within said housing carrying a first set, a second set and a third set of planetary gears, at least the first and second of said three sets being comprised of double gears having first and second sides, the gears of said third set meshing with the second side of the gears of said second set;

(d) first and second clutches controlling power flow from said input shaft through first and second main drive paths to said main planetary carrier;

(e) a hi-lo planetary in said second main drive path;

(f) a first ring gear and a first sun gear meshing with the first side of said first set of planetary gears, said second main drive path providing lower to said first sun gear;

(g) first brake means for selectively braking said first ring gear against rotation relative to said housing;

(h) a second ring gear and a second sun gear meshing with the second side of said first set of planetary gears, said first main drive path providing power to said second sun gear;

(i) second brake means for selectively braking said second ring gear against rotation relative to said housing;

(j) a third ring gear and a third sun gear meshing with the first side of said second set of planetary gears;

(k) third brake means for selectively braking said third ring gear against rotation relative to said housing;

(l) a fourth ring gear and a fourth sun gear meshing with said third set of planetary gear;

(m) fourth brake means for selectively braking said fourth ring gear against rotation relative to said housing;

(n) fifth brake means for selectively braking said fourth sun gear against rotation relative to said housing;

(o) third clutch means for selectively clutching said fourth sun gear against rotation relative to said main planetary carrier; and (p) an output shaft fixed for rotation with said fourth sun gear and extending out of said transmission.

2. The vehicle transmission of claim 1, wherein said first, second, third, fourth and fifth brakes and said first, second and third clutches are biased out of engagement.

3. The vehicle transmission of claim 1, wherein said first and second clutches share a common clutch drum.

4. The vehicle transmission of claim 1, wherein said first and second brakes share a common brake drum and wherein said third and fourth brakes share a common brake drum.

5. The vehicle transmission of claim 1, wherein said third set of planetary gears is formed of single gears.

6. The vehicle transmission of claim 1, wherein said hi-lo planetary comprises:

(a) a hi-lo planetary carrier carrying a set of planetary gears and fixed for rotation with a driven side of said first clutch;

(b) a hi-lo ring gear meshing with said hi-lo planetary gears and fixed for rotation with said first sun gear;

(c) a hi-lo sun gear meshing with said hi-lo planetary gears;

(d) hi-lo brake means for selectively braking said hi-lo sun gear against rotation relative to said housing; and (e) hi-lo clutch means for selectively clutching said hi-lo sun gear against rotation relative to said hi-lo planetary carrier.

7. The vehicle transmission of claim 6, wherein said hi-lo planetary gears are double gears having first and second sides, said hi-lo ring gear meshing with the first side and said hi-lo ring gear meshing with the second side.

8. The vehicle transmission of claim 6, wherein said hi-lo brake is biased into engagement and said hi-lo clutch is biased out of engagement.

9. A vehicle transmission comprising:

(a) a transmission housing;

(b) an input shaft extending into said housing;

(c) a first hollow intermediate shaft rotatably mounted about said input shaft;

(d) a first clutch for selectively connecting said first intermediate shaft to said input shaft for rotation therewith;

(e) a second hollow intermediate shaft rotatably mounted about said first intermediate shaft;

(f) a second clutch for selectively connecting said intermediate shaft to said input shaft;

(g) a hollow intermediate drum rotatably mounted about said first intermediate shaft adjacent to said second intermediate shaft;

(h) an output shaft rotatably mounted about said input shaft adjacent to said first intermediate shaft and extending out of said housing;

(i) a hollow brake shaft rotatably mounted about said output shaft;

(j) a hi-lo planetary gearset mounted about said second intermediate shaft having an input connected for rotation with said intermediate shaft and an output connected for rotation with said intermediate drum; and (k) a main planetary gearset having:

(1) a main planetary carrier rotatably mounted about said first intermediate shaft, said intermediate drum, said output shaft and said brake shaft;

(2) a first set of planetary gears rotatably mounted to said main planetary carrier, each gear of said first set comprising a double gear having a first and a second set of gear teeth;

(3) a first sun gear mounted for rotation with said intermediate drum and meshing with said first set of gear teeth of said first set of planetary gears;

(4) a first ring gear meshing with said first set of gear teeth of said first set of planetary gears;

(5) a first brake for selectively braking said first ring gear against rotation relative to said housing;

(6) a second sun gear mounted for rotation with said first intermediate shaft and meshing with said second set of gear teeth of said first set of planetary gears;

(7) a second ring gear meshing with said second set of gear teeth of said first set of planetary gears;

(8) a second brake for selectively braking said second ring gear against rotation relative to said housing;

(9) a second set of planetary gears rotatably mounted to said main planetary carrier, each gear of said second set comprising a double gear having a first and a second set of gear teeth;

(10) a third sun gear mounted for rotation with said output shaft and meshing with said first set of teeth of said second set of planetary gears;

(11) a third ring gear meshing with said first set of teeth of said second set of planetary gear;

(12) a third brake for selectively braking said third ring gear against rotation relative to said housing;

(13) a third set of planetary gears rotatably mounted to said main planetary carrier, said third set of planetary gears meshing with said second set of teeth of said second set of planetary gears;

(14) a fourth sun gear mounted for rotation with said brake shaft and meshing with said third set of planetary gears;

(15) a fourth ring gear meshing with said third set of planetary gears;

(16) a fourth brake for selectively braking said fourth ring gear against rotation relative to said housing;

(17) a third clutch for selectively clutching said fourth ring gear to said main planetary carrier; and (18) a fifth brake for selectively braking said brake shaft against rotation relative to said housing.

10. The vehicle transmission of claim 9, wherein said third set of planetary gears is formed of single gears.

11. The vehicle transmission of claim 9, wherein said first, second, third, fourth and fifth brakes and said first, second and third clutches are biased out of engagement.

12. The vehicle transmission of claim 9, wherein said hi-lo planetary comprises:
 (a) a hi-lo planetary carrier mounted for rotation with said second intermediate shaft and serving as said input means;
 (b) a hi-lo sun gear rotatably mounted about said second intermediate shaft;
 (c) a hi-lo ring gear mounted for rotation with said intermediate drum and serving as said output means;
 (d) a set of hi-lo planetary gears rotatably mounted to said hi-lo planetary carrier and meshing with said hi-lo sun gear and said hi-lo ring gear;
 (e) a hi-lo brake for selectively braking said hi-lo sun gear against rotation relative to said housing; and
 (f) a hi-lo clutch for selectively clutching said hi-lo sun gear to said hi-lo ring gear.

13. The vehicle transmission of claim 12, wherein said hi-lo planetary gears are formed of double gears having a first and a second set of gear teeth, said hi-lo sun gear meshing with the first set of gear theeth of said hi-lo planetary gears and said hi-lo ring gear meshing with the second set of gear teeth of said hi-lo planetary gears.

14. The vehicle transmission of claim 12, wherein said hi-lo brake is biased into engagement and said hi-lo clutch is biased out of engagement.

* * * * *

UNITED STATES PATENT AND TRADEMARK OFFICE
CERTIFICATE OF CORRECTION

PATENT NO. : 5,011,465

DATED : 30 April 1991

INVENTOR(S) : Dennis Lee Jeffries et al.

It is certified that error appears in the above-identified patent and that said Letters Patent is hereby corrected as shown below:

In Col. 7, line 13, delete "lower" and insert -- power --.

In Col. 10, line 21, delete "theeth" and insert -- teeth --.

Signed and Sealed this

Twentieth Day of October, 1992

Attest:

DOUGLAS B. COMER

Attesting Officer

Acting Commissioner of Patents and Trademarks